United States Patent
Ikedaya et al.

(10) Patent No.: US 9,669,834 B2
(45) Date of Patent: Jun. 6, 2017

(54) REGENERATIVE CONTROL DEVICE FOR HYBRID VEHICLE

(71) Applicant: MITSUBISHI JIDOSHA KOGYO KABUSHIKI KAISHA, Tokyo (JP)

(72) Inventors: Hisakazu Ikedaya, Okazaki (JP); Katsunori Ueda, Okazaki (JP); Kentaro Honda, Okazaki (JP); Shigetoshi Hirano, Toyoake (JP); Tadayoshi Hirao, Okazaki (JP); Takahiro Oguma, Nagoya (JP); Takuya Sato, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/836,460

(22) Filed: Aug. 26, 2015

(65) Prior Publication Data

US 2016/0059857 A1    Mar. 3, 2016

(30) Foreign Application Priority Data

Aug. 27, 2014 (JP) .................... 2014-172327

(51) Int. Cl.
*B60W 10/18* (2012.01)
*B60T 8/00* (2006.01)
(Continued)

(52) U.S. Cl.
CPC ......... *B60W 30/18127* (2013.01); *B60K 6/46* (2013.01); *B60L 7/18* (2013.01);
(Continued)

(58) Field of Classification Search
CPC combination set(s) only.
See application file for complete search history.

(56) References Cited

U.S. PATENT DOCUMENTS

| 5,788,597 A | 8/1998 | Boll et al. |
| 2004/0026928 A1* | 2/2004 | Wakashiro ............... B60K 6/48 290/40 C |

(Continued)

FOREIGN PATENT DOCUMENTS

| CN | 102882263 A1 | 1/2013 |
| DE | 44 46 485 A1 | 6/1996 |

(Continued)

OTHER PUBLICATIONS

Extended European Search Report dated Nov. 26, 2015 issued in corresponding European Application No. 15182793.8.

*Primary Examiner* — Yonel Beaulieu
(74) *Attorney, Agent, or Firm* — Birch, Stewart, Kolasch & Birch, LLP

(57) ABSTRACT

A regenerative control device for a hybrid vehicle includes a regenerative braking power control unit prohibiting or limiting execution of first regenerative braking to charge the battery with power generated by the regenerative power generation of the traveling motor generator during deceleration when it is determined that it is necessary to restrict charging of the battery. Under condition where the execution of the first regenerative braking is prohibited or limited, the regenerative braking power control unit causes second regenerative braking to transmit rotary driving power to the engine by rotating the power generation motor generator by the power generated by the regenerative power generation, to be executed when the operation unit is set to a regeneration level in an increasing direction, and causes the second regenerative braking to be stopped when the operation unit is set to a regeneration level in a decreasing direction.

6 Claims, 5 Drawing Sheets

(51) Int. Cl.

| | | |
|---|---|---|
| *B60L 7/10* | (2006.01) | |
| *B60L 7/20* | (2006.01) | |
| *B60W 30/18* | (2012.01) | |
| *B60K 6/46* | (2007.10) | |
| *B60L 7/18* | (2006.01) | |
| *B60L 11/12* | (2006.01) | |
| *B60L 11/18* | (2006.01) | |
| *B60L 15/20* | (2006.01) | |
| *B60W 10/08* | (2006.01) | |
| *B60W 20/00* | (2016.01) | |
| *B60K 6/442* | (2007.10) | |
| *B60W 50/08* | (2012.01) | |
| *B60W 50/00* | (2006.01) | |

(52) U.S. Cl.
CPC ......... *B60L 11/123* (2013.01); *B60L 11/1803* (2013.01); *B60L 11/1862* (2013.01); *B60L 15/2009* (2013.01); *B60W 10/08* (2013.01); *B60W 10/18* (2013.01); *B60W 20/00* (2013.01); *B60K 6/442* (2013.01); *B60L 2240/12* (2013.01); *B60L 2250/12* (2013.01); *B60L 2270/145* (2013.01); *B60W 50/085* (2013.01); *B60W 2050/0073* (2013.01); *B60W 2510/10* (2013.01); *B60W 2510/244* (2013.01); *B60W 2710/086* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01)

(56) References Cited

U.S. PATENT DOCUMENTS

| | | | |
|---|---|---|---|
| 2007/0241611 A1* | 10/2007 | Shimada | B60K 6/44 303/152 |
| 2013/0015791 A1 | 1/2013 | Hatsumi et al. | |
| 2013/0062941 A1* | 3/2013 | Yamamoto | B60K 6/445 307/10.6 |
| 2013/0226379 A1* | 8/2013 | Hirai | B60K 6/445 701/22 |
| 2014/0163803 A1* | 6/2014 | Kamatani | B60K 6/445 701/22 |
| 2014/0180518 A1 | 6/2014 | Hayashi | |
| 2015/0224981 A1 | 8/2015 | Fujishiro et al. | |
| 2015/0283991 A1* | 10/2015 | Dalum | B60W 20/10 701/22 |
| 2016/0059844 A1* | 3/2016 | Ikedaya | B60W 10/18 701/22 |

FOREIGN PATENT DOCUMENTS

| | | |
|---|---|---|
| EP | 2 749 446 A2 | 7/2014 |
| JP | 2010-247749 A | 11/2010 |
| JP | 2012-6525 A | 1/2012 |
| JP | 2014-128075 A | 7/2014 |
| WO | 2014/042007 A1 | 3/2014 |

* cited by examiner

REGENERATIVE CONTROL DEVICE FOR HYBRID VEHICLE

CROSS-REFERENCE TO RELATED APPLICATION(S)

This application is based upon and claims the benefit of priority from prior Japanese patent application No. 2014-172327, filed on Aug. 27, 2014, the entire contents of which are incorporated herein by reference.

BACKGROUND

The present invention relates to a regenerative control device for a hybrid vehicle.

Among hybrid vehicles mounted with an engine and a traveling motor as driving sources of the vehicle, there is a vehicle in which a traveling motor generator where a power generation function is added to the traveling motor is used and a power generation motor generator is coupled to the engine separately from the traveling motor generator in such a manner that the driving power of the engine can be connected and disconnected to and from a power transmission path. That is, this is a series-parallel hybrid vehicle where the generation of the driving power and the power generation are performed separately at each of the engine and the traveling motor generator.

In the hybrid vehicle as described above, not only the power performance of the vehicle but also the energy efficiency during traveling are improved by using both the engine and the traveling motor generator.

For example, during traveling by the driving power of the traveling motor generator, the battery can be charged by the regenerative power generated during deceleration, and a regenerative braking power such as engine braking can be provided to the wheels.

From the viewpoint of energy efficiency, it is preferable to obtain a large regenerative power generation amount by setting the regenerative braking power to be higher; however, since the deceleration increases, the influence on the vehicle operability increases. In view of such circumstances, for example, in a related art disclosed in JP-A-2014-128075, the driver can arbitrarily select the strength of the regenerative braking power (regeneration level) during deceleration by operating an operation member such as a paddle switch or a shift lever. With this, the regenerative braking power that the driver thinks necessary can be actively obtained according to the traveling state, and both energy efficiency and vehicle operability are obtained.

On the other hand, in the hybrid vehicle as described above, since the frequency of battery charging during traveling is increased, there is a concern about battery overcharging. In particular, the amount of recovery of the regenerative power generated by the traveling motor generator affects the magnitude of the braking power of the vehicle. For this reason, it is desired to travel while recovering the regenerative power of the traveling motor generator by using some kind of method even when the battery is nearly fully charged.

Accordingly, a related art has been proposed where the motor generator coupled to the engine is driven as an electric motor to forcibly rotate the stopped engine (motoring). That is, the engine in a state of being separated from the power transmission path of the vehicle is used as the rotational load of the motor generator to cause the motor generator to consume power. By this control, regenerative braking can be performed while restricting the charging to the battery, so that driving feeling can be improved (see JP-A-2012-6525).

Moreover, a related art has been proposed where when the regenerative control of the traveling motor generator is performed with power generation while battery charging is restricted, in a case where a rotational resistance increase request to increase the rotational resistance of the engine is not made, driving of the power generation motor generator is controlled so that motoring of the engine is performed and in a case where the rotational resistance increase request is made, driving of the power generation motor generator is controlled so that the motoring of the engine is performed while the operation of the engine is controlled in such a manner that the valve timing is advanced compared with when the rotational resistance increase request is not made and that the throttle opening is adjusted within a range where the pressure of the intake system does not become lower than a predetermined pressure (see JP-A-2010-247749).

With this, even when the regenerative control of the traveling motor generator is performed while battery charging is restricted, the power generated by the traveling motor generator can be more reliably consumed by the motoring of the engine, and the lubricating oil can be inhibited from being sucked into the intake system and the combustion chamber of the engine because of the negative pressure of the intake system in association with the motoring of the engine.

Although there are arts in which regenerative braking power is generated even under a condition where battery charging is restricted as in the related arts disclosed in JP-A-2012-6525 and JP-A-2010-247749, there is a problem in that when the regeneration level is set by the driver as in the related art disclosed in JP-A-2014-128075, it is difficult to generate regenerative braking power in conformity with the setting even while charging is restricted.

SUMMARY

The present invention is made in view of such circumstances, and an object thereof is to provide a regenerative control device capable of generating a regenerative braking power conforming to the setting by the driver even while battery charging is restricted.

In order to achieve the above object, according to an aspect of the invention, there is provided a regenerative control device for a hybrid vehicle comprising: a power generation motor generator that is driven by an engine to perform power generation and is configured to function as a motor for driving the engine; a traveling motor generator that is configured to perform driving of a driving wheel of the vehicle and is configured to perform regenerative power generation; a battery that is connected to the power generation motor generator and the traveling motor generator and is configured to perform transfer of power; a first regenerative braking control unit that is configured to control execution of first regenerative braking to charge the battery with a power generated by the regenerative power generation of the traveling motor generator during deceleration of the vehicle; a second regenerative braking control unit that is configured to control execution of second regenerative braking to transmit a rotary driving power to the engine by rotating the power generation motor generator by the power generated by the regenerative power generation of the traveling motor generator during the deceleration of the vehicle; an operation unit that is configured to adjust a regeneration level indicative of a strength of a regenerative braking power of the vehicle; a battery state detection unit that is configured to detect a state of the battery; and a regenerative braking power control unit that is configured to determine whether it is necessary to restrict charging of the battery or not based on the state of the battery detected by the battery state detection unit and is configured to prohibit or limit the execution of the first regenerative braking when it is determined that it is necessary to restrict charging of the battery, the regenerative braking power control unit, under a condition where the regenerative braking power control unit prohibits or limits the execution of the first regenerative braking, is configured to cause the second regenerative braking to be executed when the operation unit is set to a regeneration level in a regenerative braking power increasing direction, and cause the second regenerative braking to be stopped when the operation unit is set to a regeneration level in a regenerative braking power decreasing direction.

DETAILED DESCRIPTION OF EXEMPLARY EMBODIMENTS

Hereinafter, a preferred embodiment of a regenerative control device for a hybrid vehicle according to the present invention will be described in detail with reference to the attached drawings.

(Embodiment)
<Apparatus Structure>

Figure 1:
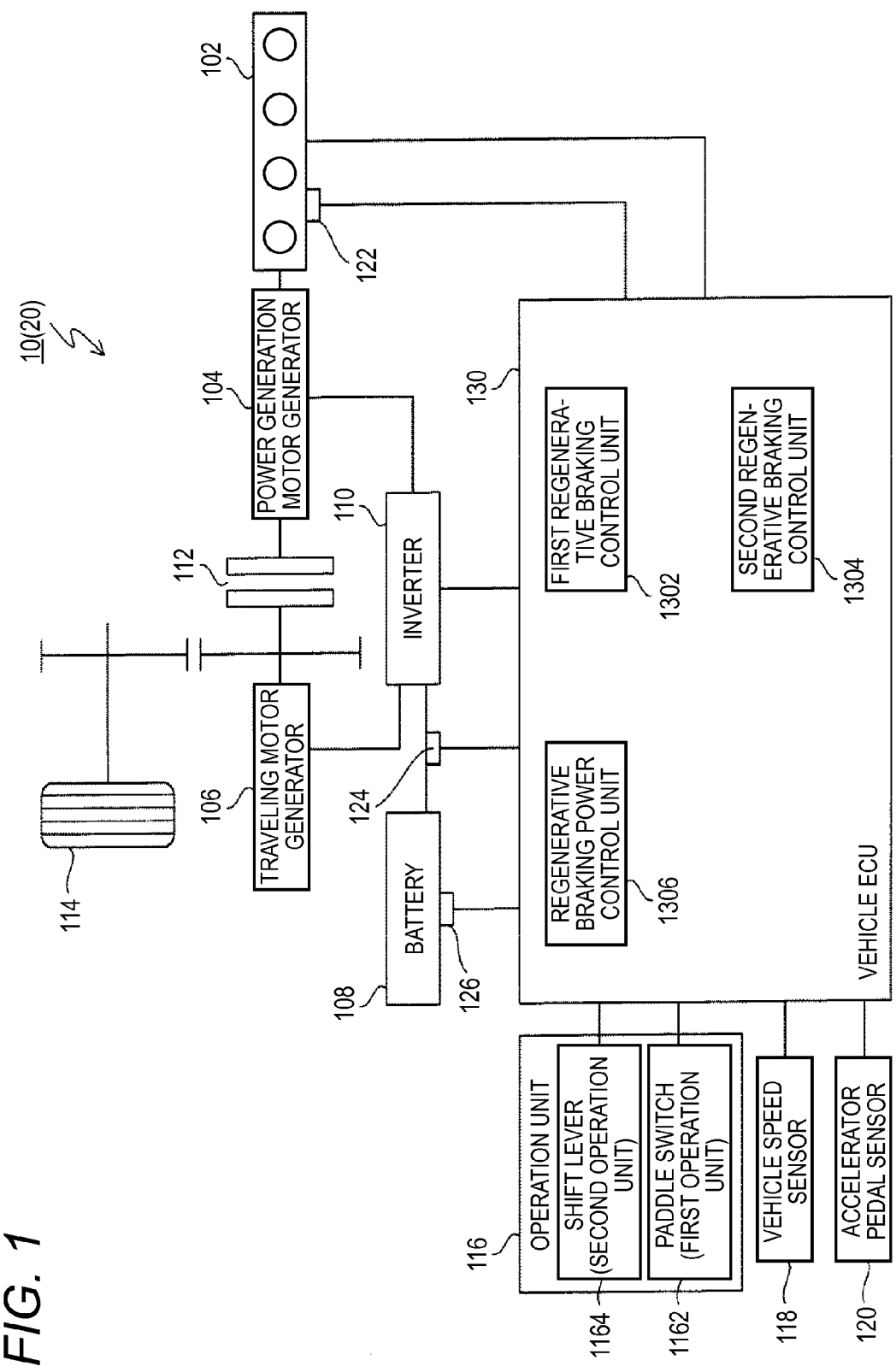
FIG. 1 is an explanatory view showing the structure of a hybrid vehicle 20 mounted with a regenerative control device 10 according to an embodiment.

FIG. 1 is an explanatory view showing the structure of the hybrid vehicle 20 mounted with the regenerative control device 10 according to the embodiment.

The hybrid vehicle 20 includes an engine 102, a power generation motor generator 104, a traveling motor generator 106, a battery (battery) 108, an inverter 110, a clutch 112, a driving wheel 114, the operation unit 116 (the paddle switch (first operation unit) 1162, the shift lever (second operation unit) 1164), a vehicle speed sensor (vehicle speed detection unit) 118, an accelerator pedal sensor 120, an engine RPM sensor 122, a charge state detection circuit 124, a temperature sensor 126 and a vehicle ECU 130.

The engine 102 is an internal-combustion engine such as a gasoline engine or a diesel engine, and causes a rotary driving power to be generated by burning a mixture gas containing a fuel (gasoline, light oil, etc.) in the combustion chamber.

The rotary driving power generated at the engine 102 is used for driving of the power generation motor generator 104 and driving of the driving wheel 114. More specifically, the engine 102 is directly coupled to the power generation motor generator 104 and disconnectably connected to the driving wheel 114 through the clutch 112. The power generation motor generator 104 is driven by the engine 102 to generate power, and functions as a motor for driving the engine 102.

When the SOC of the battery 108 becomes not more than a reference region so that the charging of the battery 108 is necessary, the engine 102 operates to drive the power generation motor generator 104 and charges the battery 108. At this time, the engine 102 and the driving wheel 114 are disconnected from each other by the clutch 112, and no power is transmitted therebetween.

When a traveling driving power is required of the engine 102, the clutch 112 is connected to supply the rotary driving power of the engine 102 to the driving wheel 114. Cases where a traveling driving power is required of the engine 102 include a case where the driver's output request (pressing of the accelerator) detected by the accelerator pedal sensor 120 becomes not less than a predetermined level (for example, the accelerator opening is equal to or greater than a reference value or the accelerator opening increase rate is equal to or greater than a reference value) so that the driving torque is insufficient with only the traveling motor generator 106 and a case where the SOC of the battery 108 detected by the charge state detection circuit 124 becomes not more than a reference value and it is intended to suppress the output of the traveling motor generator 106.

At this time, the following conditions can be taken: a condition where the power generation motor generator 104 is placed into an unloaded state and the rotary driving power of the engine 102 is all supplied to the driving wheel 114 and a condition where the power generation motor generator 104 is placed into a condition where a power generation load is imposed, part of the rotary driving power of the engine 102 is supplied to the driving wheel 114 and the power generation motor generator 104 is driven by the remaining torque.

The battery 108 is connected to the power generation motor generator 104 and the traveling motor generator 106, and power is transferred between the power generation motor generator 104 and the traveling motor generator 106.

The battery 108 supplies driving power to the traveling motor generator 106 through the inverter 110.

The battery 108 is charged by using the power generated by the power generation motor generator 104 and the traveling motor generator 106. That is, the following methods are available: a method where the power generated by the power generation by the traveling motor generator 106 during the deceleration of the hybrid vehicle 20 is supplied to the battery 108 through the inverter 110 (first regenerative braking) and a method where the power generated by the power generation motor generator 104 is supplied to the battery 108 through the inverter 110.

As described later, the power generated by the power generation by the traveling motor generator 106 may be supplied to the power generation motor generator 104 through the inverter 110.

In the periphery of the battery 108, a battery state detection unit for detecting the state of the battery is provided. In the present embodiment, as the battery state detection unit, the following are provided: the charge state detection circuit (charge state detection unit) 124 that detects the state of charge (SOC) of the battery 108 from the current (cell current) and voltage (cell voltage) of the battery cells of the battery 108 and the temperature sensor 126 that detects the temperature (cell temperature) of the battery cells of the battery 108. The information detected by these battery state detection units is outputted to the vehicle ECU 130.

The traveling motor generator 106 drives the driving wheel 114 by the power supplied from the power generation motor generator 104 or the battery 108, and is capable of generating power during the deceleration of the hybrid vehicle 20. That is, the traveling motor generator 106 performs driving of the driving wheel 114 of the hybrid vehicle 20 and regenerative power generation.

More specifically, the traveling motor generator 106 is always connected to the driving wheel 114, and when the driver's output request (pressing of the accelerator) is detected by the accelerator pedal sensor 120, the traveling motor generator 106 operates as a motor by using the power of the battery 108, generates an output torque, and outputs it to the driving wheel 114 as the driving torque for the traveling of the hybrid vehicle 20 (traveling driving torque).

Moreover, when the driver releases the accelerator, this is detected by the accelerator pedal sensor 120 and the traveling motor generator 106 functions as a generator and generates power to thereby execute the first regenerative braking. That is, power is generated by receiving the rotation torque from the driving wheel 114, and this power generation load is delivered as the braking power (regenerative braking power) of the vehicle.

The strength of the regenerative braking power can be set by the operation unit 116.

The operation unit 116 adjusts the increase/decrease of the regeneration level setting indicative of the strength of the regenerative braking power of the hybrid vehicle 20.

In the present embodiment, the operation unit 116 includes the paddle switch (first operation unit) 1162 having a plurality of steps of settings in a regenerative braking power increasing direction and in a regenerative braking power decreasing direction and the shift lever (second operation unit) 1164 capable of adjusting the regenerative braking power of the hybrid vehicle 20 only in an increasing direction with respect to the initial setting.

Figure 2:
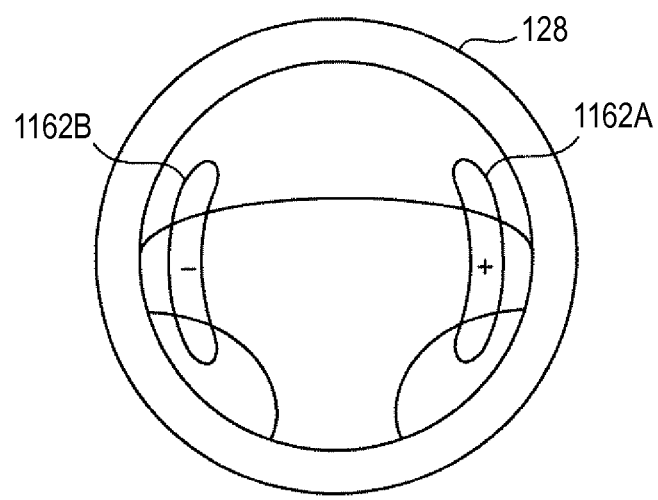
FIG. 2 is a schematic view showing a peripheral structure of a paddle switch 1162 provided on a steering 128.

FIG. 2 is a schematic view showing a peripheral structure of the paddle switch 1162 provided on the steering 128.

The paddle switch 1162 is provided with a paddle plus switch 1162A capable of switching the regenerative braking power in steps in the decreasing direction and a paddle minus switch 1162B capable of switching the regenerative braking power in steps in the increasing direction, and is structured so as to be operable by the driver depressing the paddle plus switch 1162A or the paddle minus switch 1162B while grabbing the steering 128.

Figure 3:
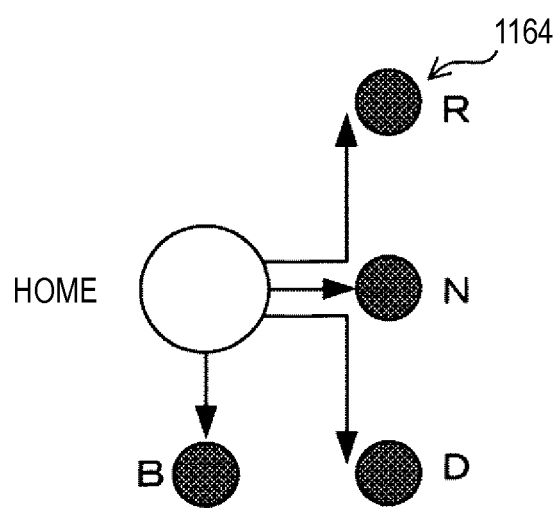
FIG. 3 is a schematic view showing from directly above a peripheral structure of a shift lever 1164 provided on the driver's seat.

FIG. 3 is a schematic view showing from directly above a peripheral structure of the shift lever 1164 provided on the driver's seat.

The shift lever 1164 is an operation portion that enables the traveling mode to be switched by the driver's operation, and is provided on the driver's seat of the hybrid vehicle 20.

The shift lever 1164 is set in the illustrated home position as the initial state, and switching to the corresponding traveling mode can be made by the driver changing the shift position backward, forward, rightward and leftward along the arrows.

Here, the N position indicates a neutral mode where the power of the traveling motor generator 106 is not transmitted to the driving wheel 114, the D position indicates a normal traveling mode where forward traveling is performed, and the R position indicates a backward traveling mode where backward traveling is performed.

When the normal traveling mode is set by selecting the D position, the regenerative braking power of the traveling motor generator 106 can be shifted in steps by operating the shift lever 1164 to the B position. When the driver releases the shift lever 1164 after operating the shift lever 1164 to the B position, the shift lever 1164 automatically returns to the home position, and the regenerative braking power (regeneration rate) shifts in the increasing direction according to the number of times of the operation to the B position.

Figure 4:
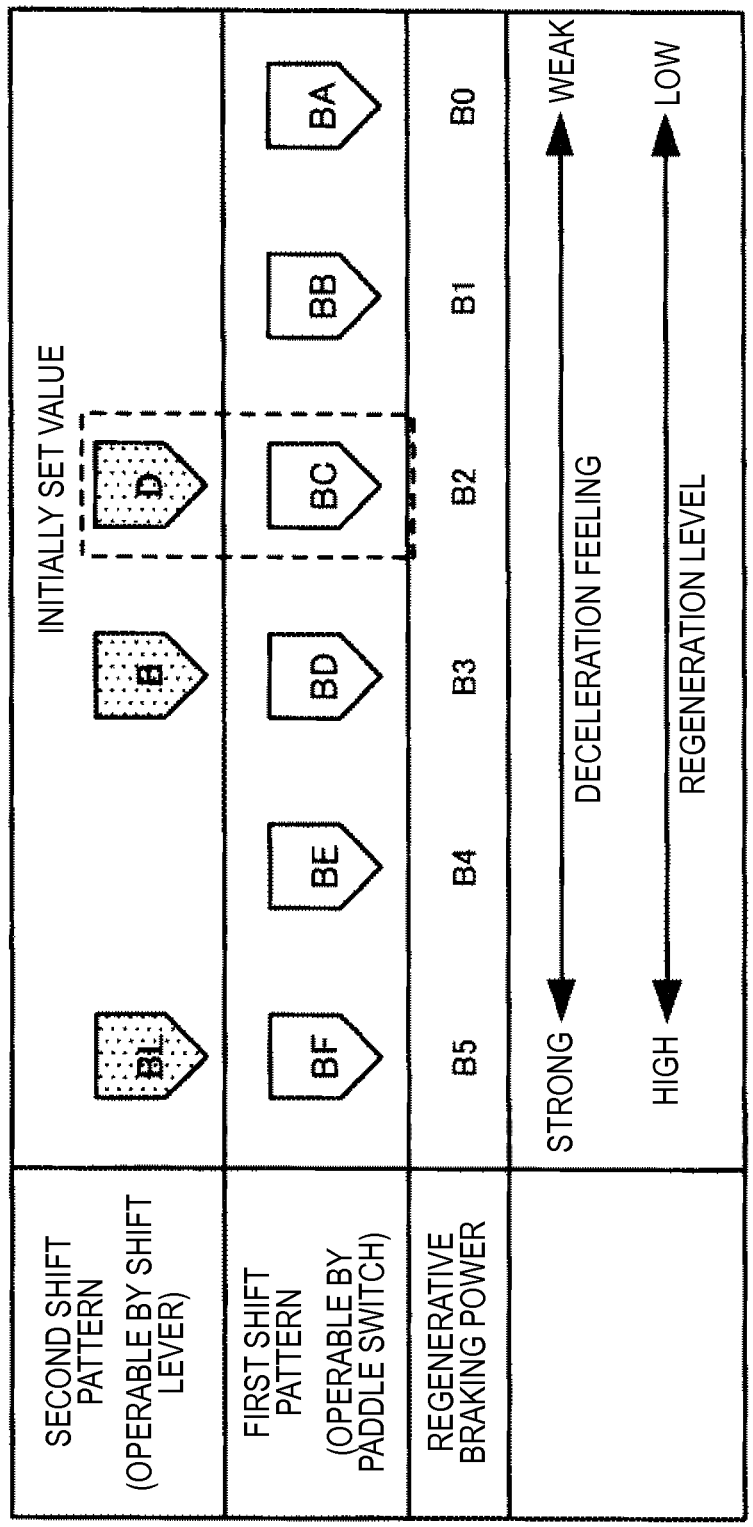
FIG. 4 is a conceptual diagram showing the regenerative braking power that can be set by the paddle switch 1162 and the shift lever 1164.

FIG. 4 is a conceptual diagram showing the regenerative braking power that can be set by the paddle switch 1162 and the shift lever 1164.

Here, the generative braking power is the regeneration rate, and the regeneration rate indicates the amount of regeneration when measurement is performed at a constant speed. For the regenerative braking power of the traveling motor generator 106, six steps of shift stages of B0 to B5 are set according to the magnitude.

Here, each shift stage is made a regeneration level, a series of shift stages that can be set by the paddle switch 1162 is grouped as a first shift pattern, and a series of shift stages that can be set by the shift lever 1164 is grouped as a second shift pattern. The regenerative braking power increases from B0 toward B5 and the driver's deceleration feeling and the regeneration level increase.

Of these regeneration levels, the initial setting as the reference is, for example, B2. That is, a condition where the shift lever 1164 described later is situated in the D position or the paddle switch 1162 is operated to BC is the initial setting.

The second shift pattern that can be selected by the shift lever 1164 is formed of shift stages D, B and BL. The shift stage D can be selected by operating the shift lever 1164 to the D position, and the regenerative braking power corresponds to B2 which is the initial setting. Shift to the shift stage B is made by operating the shift lever 1164 from the D position to the B position once, and B3 is set where the regenerative braking power is stronger than at the shift stage D. Shift to the shift stage BL is made by further operating the shift lever 1164 to the B position once, and B5 is set where the regenerative braking power is stronger than at the shift stage B.

Here, the amount of change of the regeneration rate from B3 to B5 is larger than the amount of change of the regeneration rate from B2 to B3. As described above, even when the regeneration amount is largely changed by setting the amount of regeneration rate change between the regeneration levels set by the shift lever 1164 in such a manner that it is larger at the regeneration level where the regeneration rate is higher, the regeneration amount desired by the driver can be quickly obtained by operating the shift lever 1164.

Moreover, for the shift lever 1164, the number of shift stages is smaller than that for the paddle switch 1162, and setting is made so that the number of times of the operation for setting a predetermined regeneration level is small. Since the number of times of the shift operation for obtaining the same regeneration amount as that of the paddle switch 1162 is small for the shift level 1164 for this reason, the increase/decrease of the regenerative braking power can be easily controlled by a small number of times of the operation, which is suitable for reduction in the driver's operation load. Moreover, the first shift pattern that can be selected by the paddle switch 1162 is formed of the regeneration levels of shift stages BA, BB, BC, BD, BE and BF, and the number of shift stages is larger than that of the second shift pattern.

The regenerative braking powers of the shift stages BA, BB, BC, BD, BE and BF correspond to B0, B1, B2, B3, B4 and B5, respectively, and shift can be made according to the number of times of the operation of the paddle plus switch 1162A and the paddle minus switch 1162B.

Here, the amounts of regeneration rate change of B0, B1, B2, B3, B4 and B5 may be the same. Since the regeneration amount can be increased and decreased in steps by making the same the amount of regeneration rate change between the regeneration levels set by the paddle switch 1162 as described above, delicate regenerative control is enabled.

Moreover, the number of shift stages of the paddle switch 1162 is larger than that of the shift lever 1164 and setting is made so that the number of times of the operation for setting a predetermined regeneration level is large, which is suitable for delicate control of the regenerative braking power.

By thus providing the shift lever 1164 and the paddle switch 1162 between which the number of times of the operation for setting a predetermined regeneration level is different, control of the regenerative braking power as intended by the driver can be performed according to the traveling state. In particular, at the shift lever 1164, since the number of times of the shift operation for obtaining the same regeneration amount as that at the paddle switch 1162 is small, the increase/decrease of the regenerative braking power can be easily controlled by a small number of times of the operation, which is suitable for reduction in the driver's operation load. Conversely, at the paddle switch 1162, the number of times of the shift operation is larger than that at the shift lever 1164, which is suitable for delicate control of the regenerative braking power.

Returning to the description of FIG. 1, the vehicle ECU 130 is a microcomputer including a CPU, a ROM storing a control program and the like, a RAM as a work area for the control program, an EEPROM rewritably holding various pieces of data and an interface portion serving as an interface with a peripheral circuit and the like, and controls the entire vehicle 20.

To the vehicle ECU 130, various vehicle side information sensors such as the accelerator pedal sensor 120, the engine RPM sensor 122 that detects the RPM of the engine 102 and the vehicle speed sensor 118 are connected, and from these sensors, detection information, or the traveling state information of the vehicle is inputted.

Moreover, to the vehicle ECU 130, the charge state detection circuit 124 and the temperature sensor 126 are connected, and from these sensors, detection information, or battery state information representative of the battery state is inputted.

Moreover, to the vehicle ECU 130, the current (motor current) and voltage (motor voltage) of the traveling motor generator 106 and motor driving state information such as the RPM of the motor are inputted through the inverter 110.

<Details of Control at the Regenerative Control Device 10>

The vehicle ECU 130 implements a first regenerative braking control unit 1302, a second regenerative braking control unit 1304 and a regenerative braking power control unit 1306 by the CPU executing the control program.

The first regenerative braking control unit 1302 controls the execution of the first regenerative braking to charge the battery 108 by the power generated by the power generation by the traveling motor generator 106 during the deceleration of the hybrid vehicle 20.

The first regenerative braking by the first regenerative braking control unit 1302 is, that is, "normal regeneration". When the first regenerative braking is executed, power is generated by the traveling motor generator 106 to charge the battery 108, and the power generation load is used as the braking power (regenerative braking power) of the vehicle to decelerate the hybrid vehicle 20.

The second regenerative braking control unit 1304 controls the execution of the second generative braking to transmit the rotary driving power to the engine 102 by rotating the power generation motor generator 104 by the power generated by the power generation by the traveling motor generator 106 during the deceleration of the hybrid vehicle 20.

The second regenerative braking by the second regenerative braking control unit 1304 corresponds to, that is, "motoring control".

The motoring control is a control where the engine 102 is forcibly rotated by the power generation motor generator 104 to thereby consume the power generated by the traveling motor generator 106. Thereby, the regenerative braking power can be generated without the battery 108 being charged.

In the motoring control, a control signal to switch the destination of supply of the power generated by the traveling motor generator 106 from the battery 108 to the power generation motor generator 104 is outputted from the second regenerative braking control unit 1304 to the inverter 110. At this time, the voltage, the current, the AC frequency and the like to the power generation motor generator 104 are adjusted in such a manner that a target rotary driving power described later is generated at the engine 102.

At the time of the second regenerative control, a combustion operation where fuel is supplied to the engine 102 and burned to thereby generate the rotary driving power at the engine 102, that is, "firing control" may be performed in parallel with the above-described motoring control.

The firing control is a control where fuel is supplied to the engine 102 and ignited or fired (firing) to thereby burn the fuel and a condition where heat is continuously generated at least at the engine 102 is brought about.

In the firing control, a control signal is outputted from the second regenerative braking control unit 1304 to operate the engine 102. At this time, the amount of fuel injection, the timing of fuel injection, the amount of incoming air, the time of ignition and the like are adjusted so that an engine target torque described later is generated at the engine 102.

The target torque of the engine 102 in the firing is set to, for example, a negative torque. This negative torque includes a flammability limit torque of the engine 102.

The flammability limit torque of the engine 102 is a torque generated by the combustion at the flammability limit (the minimum density limit where a mixture gas of fuel and air can be burned). For example, when the target torque of the engine 102 is set to the flammability limit torque, fuel and air of an amount just enough to maintain self-sustaining rotation is introduced to the engine 102. Therefore, when either the amount of fuel or the amount of air is reduced or when the load is increased, the engine 102 cannot maintain the self-sustaining rotation, so that the engine 102 is stalled (stopped).

As described above, the flammability limit torque is a minimum torque for maintaining self-sustaining rotation when the engine 102 is unloaded, and includes a no-load torque corresponding to a load loss (internal load) such as a mechanical friction loss, an intake/exhaust loss or a cooling loss of the engine 102. On the other hand, the flammability limit torque does not include an external load torque corresponding to a load (external load) of an external device of the engine 102 such as an air conditioning load, a transmission load or an auxiliary machine load.

An idling torque for maintaining the idling rotation of the engine 102 includes both the no-load torque and the external load torque. Therefore, the flammability limit torque has a value lower than the idling torque.

By setting the target torque of the engine 102 to a negative torque (flammability limit torque), firing is performed with a minimum fuel consumption, so that fuel efficiency can be improved.

The regenerative braking power control unit 1306 determines whether it is necessary to restrict charging of the battery 108 or not based on the state of the battery 108 detected by the battery state detection unit, and prohibits or limits the execution of the first regenerative braking when it is necessary to restrict charging. Then, the regenerative braking power control unit 1306 causes the second regenerative braking to be executed when the operation unit 116 is set to a regeneration level in the regenerative braking power increasing direction, and causes the second regenerative braking to be stopped when the operation unit 116 is set to a regeneration level in the regenerative braking power decreasing direction.

That is, the regenerative braking power control unit 1306 avoids the execution of the first regenerative braking to supply the power generated by the traveling motor generator 106 to the battery 108 when it is necessary to restrict charging, and supplies the power generated by the traveling motor generator 106 to the power generation motor generator 104 to execute the second regenerative braking only when the driver makes a setting to enhance the regenerative braking power.

More specifically, the regenerative braking power control unit 1306 controls the strength of the regenerative braking power generated by the first regenerative braking according to the setting of the operation unit 116. That is, when a setting to enhance the regenerative braking power is made for the operation unit 116, the regeneration rate of the traveling motor generator 106 is increased so that a stronger regenerative braking power is obtained. When a setting to weaken the regenerative braking power is made for the operation unit 116, the regeneration rate of the traveling motor generator 106 is reduced so that the obtained regenerative braking power is small.

On the other hand, under a condition where charging is restricted and the first regenerative braking is prohibited or limited, when a setting to enhance the regenerative braking power is made for the operation unit 116, the second regenerative braking is executed, and by the second regenerative braking, the regenerative braking power is generated and the engine 102 is operated. Moreover, when a setting to weaken the regenerative braking power is made, the second regenerative braking is stopped so that the regenerative braking power is not generated and the engine 102 is not operated.

The reason why this control is performed is in order to improve convenience by performing a regeneration operation according to the driver's preference when charging is restricted. More specifically, when the second regenerative braking is executed, the engine 102 rotates to cause noise. When firing is executed together with motoring, fuel is consumed slightly. Therefore, for a driver who does not like these, it is desired not to execute the second regenerative braking.

For this reason, the second regenerative braking is executed only when the driver positively operates the operation unit 116 to request for an increase in regenerative braking power and otherwise, the second regenerative braking is stopped, whereby it is made possible to switch between a case where the driver prefers regenerative braking power to quietness (engine-on) and a case where the driver prefers quietness or fuel efficiency improvement to regenerative braking power (engine-off).

Figure 6:
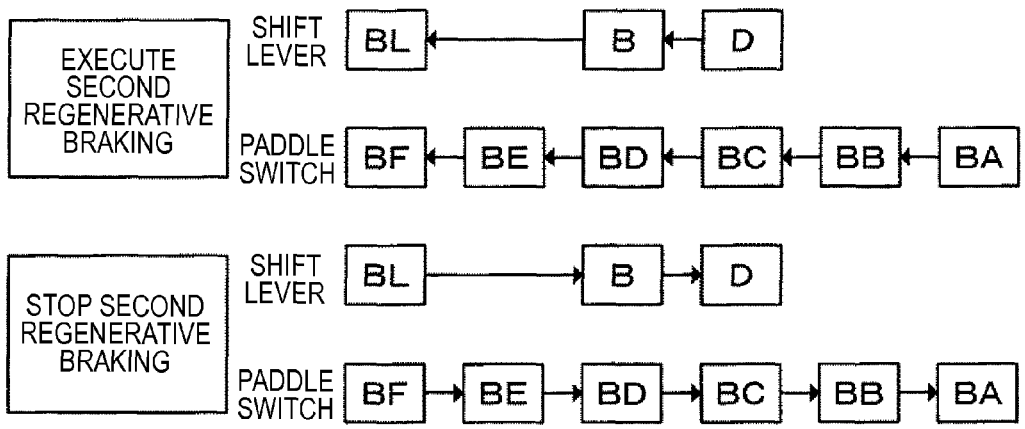
FIG. 6 is an explanatory view showing an example of setting of whether the execution of second regenerative braking is possible or not with respect to the condition of an operation unit 116.

The "setting in the regenerative braking power increasing direction" for the operation unit 116 indicates, as shown in the upper part of FIG. 6, when the operation unit 116 is the paddle switch 1162, an operation to change the shift stage from BA to BB, from BB to BC, from BC to BD, from BD to BE or from BE to BF, and when the operation unit 116 is the shift lever 1164, an operation to change the shift stage from D to B or from B to BL.

Moreover, the "setting in the regenerative braking power decreasing direction" for the operation unit 116 indicates, as shown in the lower part of FIG. 6, when the operation unit 116 is the paddle switch 1162, an operation to change the shift stage from BF to BE, from BE to BD, from BD to BC, from BC to BB or from BB to BA, and when the operation unit 116 is the shift lever 1164, an operation to change the shift stage from BL to B or from B to D.

The case where it is determined that the restriction of charging of the battery 108 is necessary is, for example, a case where the SOC of the battery 108 is equal to or greater than a predetermined upper limit and there is a concern about overcharging. In this case, the battery state detection unit is the charge state detection circuit 124 (charge state detection unit) that detects the state of charge of the battery 108, and when the state of charge detected by the charge state detection circuit 124 is equal to or greater than a predetermined upper limit in the neighborhood of full charge, the regenerative braking power control unit 1306 determines that charging of the battery 108 is necessarily restricted.

Additionally, another example of the case where it is determined that the restriction of charging of the battery 108 is necessary is a case where the temperature of the battery 108 is extremely low or extremely high.

Moreover, prohibiting the execution of the first regenerative braking at the regenerative braking power control unit 1306 indicates that regenerative power generation is not performed at the traveling motor generator 106 or that the power generated by the traveling motor generator 106 is not inputted to the battery 108 at all. Moreover, limiting the execution of the first regenerative braking at the regenerative braking power control unit 1306 indicates that only part of the power generated by the traveling motor generator 106 is used for charging the battery 108.

Specifically, for example, when the SOC of the battery 108 is equal to or greater than 98%, the power regenerated by the traveling motor generator 106 is not inputted to the battery 108 (the first regenerative braking is prohibited), when the SOC is equal to or greater than 95% and less than 98%, up to 7 kW of the power regenerated by the traveling motor generator 106 is inputted to the battery 108 (the first regenerative braking is limited), and when the SOC is less than 95%, all the power regenerated by the traveling motor generator 106 is inputted to the battery 108 (the first regenerative braking is executed).

Moreover, the regenerative braking power control unit 1306 may be structured so that when the operation unit 116 is set to a regeneration level in the regeneration braking power increasing direction from a predetermined regeneration level under a condition where the execution of the first regenerative braking is prohibited or limited, the second regenerative braking is executed and when the operation unit 116 is set to the predetermined regeneration level or to a regeneration level in the regenerative braking power decreasing direction from the predetermined regeneration level thereafter, the second regenerative braking is stopped.

Figure 7:
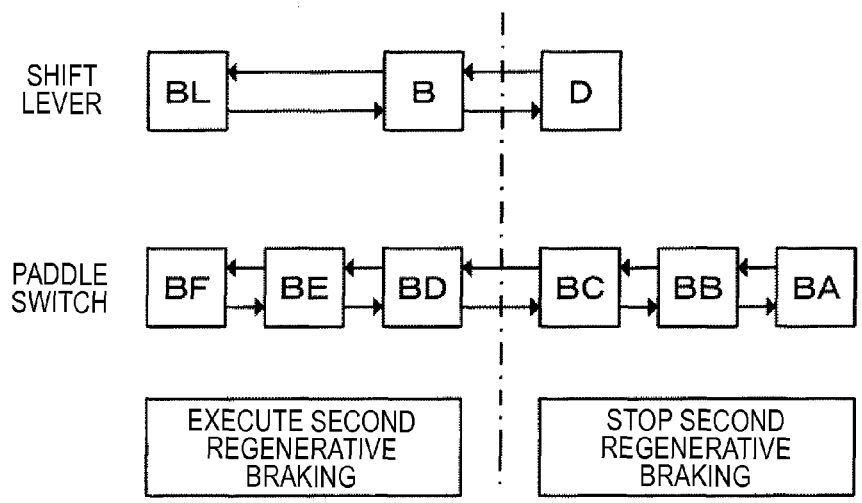
FIG. 7 is an explanatory view showing an example of the setting of whether the execution of the second regenerative braking is possible or not with respect to the state of the operation unit 116.

Here, the "predetermined regeneration level" is, for example, B2 which is the above-described initial setting of the regeneration level and indicates a condition where the shift lever 1164 is in the D position or the paddle switch 1162 is operated to BC. Therefore, in this case, the "regeneration level in the regenerative braking power increasing direction from the predetermined regeneration level" indicates a condition where as shown in the left side of FIG. 7, the shift lever 1164 is operated to the B position and the shift stage is B or BL, or the paddle switch 1162 is operated to any of BD, BE and BF. Moreover, the "regeneration level in the regenerative braking power decreasing direction from the predetermined regeneration level" indicates a condition where as shown in the right side of FIG. 7, the paddle switch 1162 is operated to BA or BB, and the shift lever 1164 does not have a corresponding operation.

When the operation unit 116 is set to a regeneration level in the regenerative braking power increasing direction from the predetermined regeneration level, the regenerative braking power control unit 1306 continues the execution of the second regenerative braking until the operation unit 116 is set to the predetermined regeneration level or a regeneration level in the regenerative braking power decreasing direction from the predetermined regeneration level thereafter.

Therefore, once the second regenerative braking is started, the second regenerative braking does not readily stop and frequent repetition of operation/stopping of the engine can be suppressed, so that noise and fluctuations in regenerative braking power can be prevented.

For example, a structure may be adopted in which when the execution of the first regenerative braking is prohibited or limited under a condition where the operation unit 116 is set to a regeneration level in the regenerative braking power increasing direction from the predetermined regeneration level, the second regenerative braking is executed and when the operation unit 116 is set to the predetermined regeneration level or a regeneration level in the regenerative braking power decreasing direction from the predetermined regeneration level thereafter, the second regenerative braking is stopped.

That is, the second regenerative braking may be executed also when charging restriction is necessary because of an increase in the SOC of the battery 108 or the like and the execution of the first regenerative braking is prohibited or limited during traveling under a condition where a setting to enhance the regenerative braking power is made for the operation unit 116.

Moreover, a structure may be adopted in which when the operation unit 116 is the first operation unit having a plurality of steps of settings in the regenerative braking power increasing direction and in the regenerative braking power decreasing direction, that is, the paddle switch 1162, for the first regenerative braking, the regenerative braking power control unit 1306 executes a plurality of steps of settings according to the setting by the first operation unit (paddle switch 1162) and for the second regenerative braking, the regenerative braking power control unit 1306 performs two steps of settings of execution and stopping.

That is, when charging is not restricted (when the first regenerative braking is executed), the strength is finely changed according to the setting of the paddle switch 1162 to generate regenerative braking power, and when charging is restricted, either a condition where regenerative braking is performed (the second regenerative braking is executed) or a condition where regenerative braking is not performed (the second regenerative braking is stopped) is set. Whether the regenerative braking is performed or not when charging is restricted may be switched, for example, according to whether the setting for the paddle switch 1162 is equal to or greater than the predetermined regeneration level or not.

Thereby, for the first operation unit (paddle switch 1162) operated in multiple steps, at least two switching modes can be set even when charging is restricted, so that minimum convenience can be ensured. Moreover, that the regenerative braking power cannot be switched in multiple steps makes it easy for the driver to notice that charging is restricted and recognize that the situation is such that regenerative braking does not work as it does at the ordinary time.

Moreover, a structure may be adopted in which in a case where the operation unit 116 is the second operation unit (shift lever 1164) capable of adjusting the regenerative braking power of the hybrid vehicle 20 only in the increasing direction with respect to the initial setting, when the second operation unit (shift lever 1164) is operated from the initial setting in the regenerative braking power increasing direction under a condition where the execution of the first regenerative braking is prohibited or limited, the regenerative braking power control unit 1306 causes the second regenerative braking to be executed and when the second operation unit (shift lever 1164) is returned to the initial setting thereafter, the regenerative braking power control unit 1306 causes the second regenerative braking to be stopped.

The initial setting of the regenerative braking power corresponds, in the present embodiment, to the regeneration level B2 and when the shift lever 1164 is in the D position as described above. Therefore, the regenerative braking power control unit 1306 causes the second regenerative braking to be executed when the shift lever 1164 is operated from the D position to the B position.

Then, when the shift lever 1164 is operated to the D position thereafter, the second regenerative braking is stopped.

Although the shift stage can be changed from B to BL by operating the shift lever 1164 to the B position a plurality of number of times, it is needless to say that even when such an operation is performed, the second regenerative braking control is continued.

As described above, in a case where the operation unit 116 is the shift lever 1164, when the regenerative braking power is operated in the increasing direction with respect to the initial setting (D to B), the second regenerative braking is executed, and when it is returned to the initial setting (B to D), the second regenerative braking is stopped, so that setting conforming to the driver's operation can be realized.

Moreover, the regenerative braking power control unit 1306 may cause the second regenerative braking to be executed when the traveling speed of the hybrid vehicle 20 is equal to or greater than a predetermined speed. The traveling speed of the hybrid vehicle 20 can be obtained from the vehicle speed detection unit (vehicle speed sensor 118) for detecting this.

This is because if the engine 102 is driven when the speed is low, noise and vibrations are readily transmitted to the driver and this can adversely affect the traveling feeling. Conversely, during traveling at a certain degree of traveling speed, caused discomfort is considered scarce even if the wind noise and the like of the vehicle increase and the engine 102 is driven. Therefore, the traveling feeling of the hybrid vehicle 20 can be improved by performing the driving of the engine 102 by the second regenerative braking only when the traveling speed of the hybrid vehicle 20 is equal to or greater than a predetermined speed.

Figure 5:
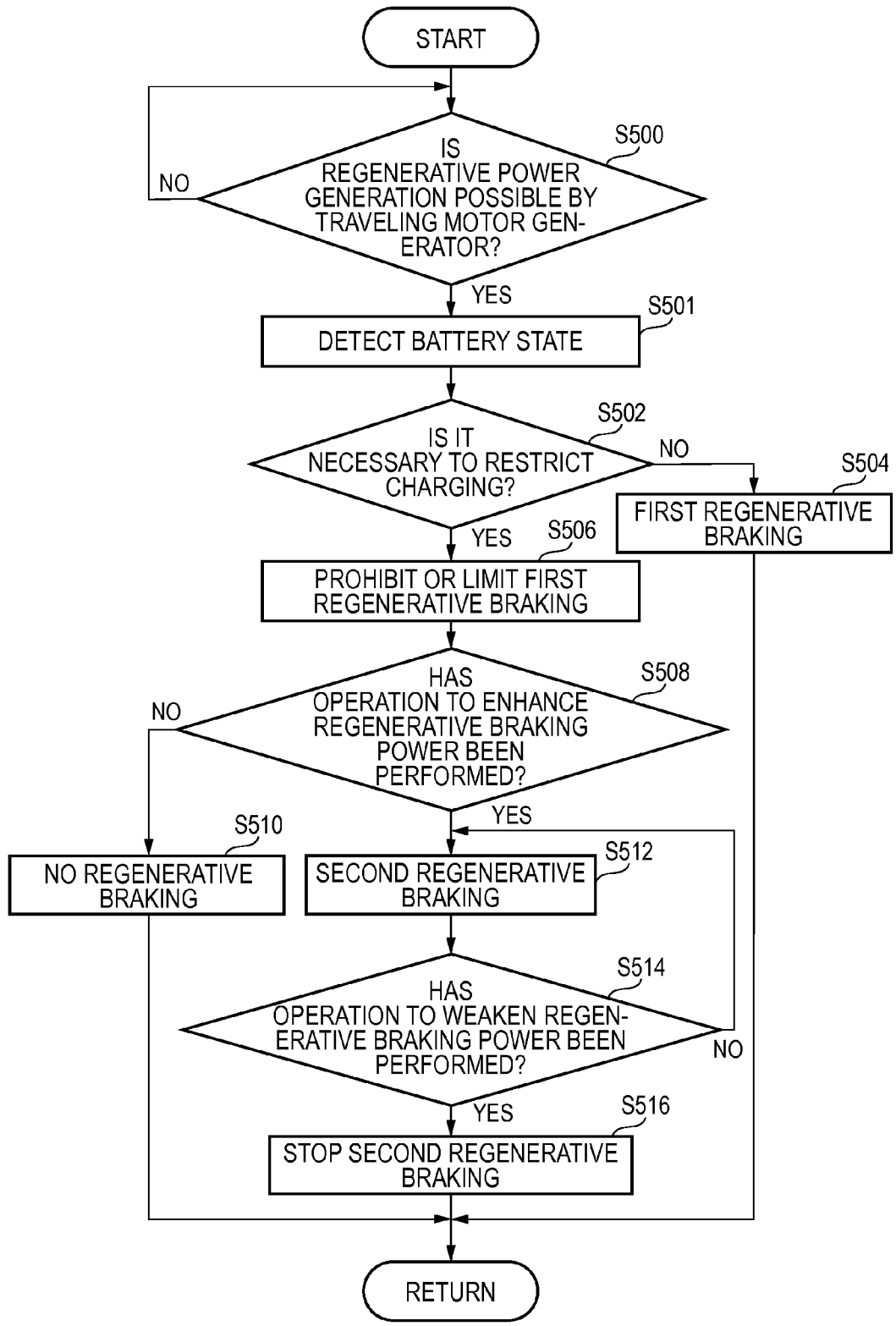
FIG. 5 is a flowchart showing the procedure of the regenerative braking processing of the regenerative control device 10.

FIG. 5 is a flowchart showing the procedure of the regenerative braking processing of the regenerative control device 10.

The regenerative control device 10 repetitively executes the processing of FIG. 5 while the hybrid vehicle 20 is traveling.

When detecting that the condition is such that regenerative power generation by the traveling motor generator 106 is possible such as during the deceleration of the hybrid vehicle 20 (step S500: Yes), the regenerative control device 10 detects the state of the battery 108 by the battery state detection unit such as the charge state detection circuit 124 (step S501). The state of the battery 108 is, for example, the state of charge (SOC) of the battery 108.

The regenerative braking power control unit 1306 determines whether it is necessary to restrict charging of the battery 108 or not based on the state of the battery 108 detected at step S501.

When the information detected at step S501 is the state of charge of the battery 108, the regenerative braking power control unit 1306 determines that it is necessary to restrict charging when the state of charge is equal to or greater than a predetermined upper limit in the neighborhood of full charge, and determines that it is not necessary to restrict charging when it is less than the predetermined upper limit.

When it is determined that it is unnecessary to restrict charging at step S502 (step S502: No), the normal regenerative braking, that is, the first regenerative braking to charge the battery 108 by the power generation by the traveling motor generator 106 is executed by the first regenerative braking control unit 1302 (step S504).

At this time, the first regenerative braking control unit 1302 controls the power generation load and the like of the traveling motor generator 106 in such a manner that the regenerative braking power of a strength set by the operation unit 116 is generated.

On the other hand, when it is determined that it is necessary to restrict charging at step S502 (step S502: Yes), the regenerative braking power control unit 1306 prohibits or limits the first regenerative braking by the first regenerative braking control unit 1302 (step S506).

When the first regenerative braking is prohibited, the power generated by the traveling motor generator 106 during deceleration is not inputted to the battery 108. When the first regenerative braking is limited, only part of the power generated by the traveling motor generator 106 during deceleration is inputted to the battery 108.

Then, the regenerative braking power control unit 1306 determines whether an operation to enhance the regenerative braking power has been performed on the operation unit 116 or not (step S508). The operation to enhance the regenerative braking power is an operation to make the regeneration level higher than the current regeneration level as shown in the upper part of FIG. 6 or an operation to make the regeneration level higher than a predetermined regeneration level (B2) as shown on the left side of FIG. 7.

When the operation to enhance the regenerative braking power has not been performed (step S508: No), regenerative braking is not performed (step S510). That is, without the power generation by the traveling motor generator 106 being performed, the hybrid vehicle 20 travels without generating regenerative braking power.

On the other hand, when the operation to enhance the regenerative braking power has been performed (step S508: Yes), the regenerative braking power control unit 1306 causes the second regenerative braking control unit 1304 to execute the second regenerative braking (step S512). That is, the power generation by the traveling motor generator 106 is performed to generate regenerative braking power, and the power generation motor generator 104 is rotated by the power generated by the power generation.

The regenerative braking power control unit 1306 determines whether an operation to weaken the regenerative braking power has been performed on the operation unit 116 or not as occasion arises (step S514). The operation to weaken the regenerative braking power indicates an operation to make the regeneration level lower than the current regeneration level as shown in the lower part of FIG. 6 or an operation to make the regeneration level not more than the predetermined regeneration level (B2) as shown on the right side of FIG. 7.

When the operation to weaken the regenerative braking power has not been performed (step S514: No), the process returns to step S512, and the second regenerative braking is continued.

When the operation to weaken the regenerative braking power has been performed (step S514: Yes), the second regenerative braking is stopped (step S516).

As described above, in the regenerative control device 10 according to the embodiment, whether or not to execute the second regenerative braking when charging of the battery 108 is restricted is determined according to the state of the operation on the operation unit 116 for setting the strength of the regenerative braking power. Therefore, when charging is restricted, a regeneration operation is performed according to the driver's preference, that is, whether to attach weight to the securement of the regenerative braking power or to quietness and fuel efficiency improvement, so that convenience can be improved.

At this time, by determining whether to execute the second regenerative braking or not based on whether the state of the operation on the operation unit 116 is equal to or less than a predetermined regeneration level or not, once the second regenerative braking is started, the execution of the second regenerative braking does not readily stop and frequent repetition of operation/stopping of the engine can be suppressed, so that noise and fluctuations in regenerative braking power can be prevented.

Moreover, in the regenerative control device 10, by performing the second regenerative braking only when the traveling speed of the hybrid vehicle 20 is equal to or greater than a predetermined speed, the influence of the noise and vibrations due to the engine driving is reduced, so that the traveling feeling of the hybrid vehicle 20 can be improved.

According to an aspect of the invention, whether or not to perform the second regenerative braking when charging of the battery is restricted is determined according the state of the operation on the operation unit for setting the strength of the regenerative braking power. Therefore, when charging is restricted, a regeneration operation is performed according to the driver's preference, that is, whether to attach weight to the securement of the regenerative braking power or to quietness and fuel efficiency improvement, so that convenience can be improved.

Under the condition where the regenerative braking power control unit prohibits or limits the execution of the first regenerative braking, the regenerative braking power control unit may cause the second regenerative braking to be executed when the operation unit is set to a regeneration level in the regenerative braking power increasing direction from a predetermined regeneration level, and cause the second regenerative braking to be stopped when the operation unit is set to the predetermined regeneration level or a regeneration level in the regenerative braking power decreasing direction from the predetermined regeneration level thereafter. In this case, once the second regenerative braking is started, the second regenerative braking does not readily stop and frequent repetition of execution/stopping can be suppressed, so that noise and fluctuations in regenerative braking power can be prevented.

The operation unit may be a first operation unit having a plurality of steps of settings in the regenerative braking power increasing direction and in the regenerative braking power decreasing direction. For the first regenerative braking, the regenerative braking power control unit may execute a plurality of steps of settings according to setting by the first operation unit, and, for the second regenerative braking, the regenerative braking power control unit may execute two steps of settings of execution and stopping. In this case, for the first operation unit operated in multiple steps, at least two regenerative braking power strengths can be set even when charging is restricted, so that minimum convenience can be ensured. Moreover, that the regenerative braking power cannot be switched in multiple steps makes it easy for the driver to notice that charging is restricted and recognize that the situation is such that regenerative braking does not work as it does at the ordinary time.

The operation unit may be a second operation unit capable of adjusting the regenerative braking power of the vehicle only in the regenerative braking power increasing direction with respect to an initial setting. Under the condition where the regenerative braking power control unit prohibits or limits the execution of the first regenerative braking, the regenerative braking power control unit may cause the second regenerative braking to be executed when the second operation unit is operated from the initial setting in the regenerative braking power increasing direction, and cause the second regenerative braking to be stopped when the second operation unit is returned to the initial setting thereafter. In this case, when the operation unit is the second operation unit, setting conforming to the driver's operation can be realized.

The battery state detection unit may be a charge state detection unit configured to detect a state of charge of the battery. The regenerative braking power control unit may determine that it is necessary to restrict charging of the battery when the state of charge detected by the charge state detection unit is equal to or greater than a predetermined upper limit in a neighborhood of full charge. In this case, performance degradation due to battery overcharging can be prevented.

The regenerative control device may further include a vehicle speed detection unit that is configured to detect a traveling speed of the vehicle. The regenerative braking power control unit may cause the second regenerative braking to be executed when the traveling speed is equal to or greater than a predetermined speed. In this case, by performing the second regenerative braking only when the traveling speed of the hybrid vehicle is not less than a predetermined speed, the influence of the noise and vibrations due to the engine driving is reduced, so that the traveling feeling of the hybrid vehicle can be improved.

What is claimed is:

1. A regenerative control device for a hybrid vehicle comprising:
   a power generation motor generator that is driven by an engine to perform power generation and functions as a motor for driving the engine;
   a traveling motor generator that drives a driving wheel of the vehicle and performs regenerative power generation;
   a battery that is connected to the power generation motor generator and the traveling motor generator and performs transfer of power;
   an operation unit operated by a user to adjust a regeneration level indicative of a strength of a regenerative braking power of the vehicle;
   a battery state detection unit that detects a state of the battery; and
   one or more memory device having recorded thereon an instruction for executing by one or more processor to:
      control execution of first regenerative braking to charge the battery with a power generated by the regenerative power generation of the traveling motor generator during deceleration of vehicle;
      control execution of second regenerative braking to transmit a rotary driving power to the engine by rotating the power generation motor generator by the power generated by the regenerative power generation of the traveling motor generator during the deceleration of the vehicle; and
      determine whether it is necessary to restrict charging of the battery or not based on the state of battery detected by the battery state detection unit and to prohibit or limit the execution of the first regenerative braking when it is determined that it is necessary to restrict charging of the battery, and under a condition where the executive of the first regenerative braking is to be prohibited or limited, cause the second regenerative braking to be executed when the operation unit is set to a regeneration level in a regenerative braking power increasing direction, and cause the second regenerative braking to be stopped when the operation unit is set to a regeneration level in a regenerative braking power decreasing direction, wherein
   the operation unit is a first operation unit having a plurality of steps of settings in the regenerative braking power increasing direction and in the regenerative braking power decreasing direction, and
   wherein the one or more memory device stores instructions that further causes the one or more processor to:
   for the first regenerative braking, execute a plurality of steps of settings according to setting by the first operation unit, and, for the second regenerative braking, execute two steps of settings of execution and stopping.

2. The regenerative control device for the hybrid vehicle according to claim 1, wherein the one or more memory device stores instructions that further causes the one or more processor to:
   under the condition where the execution of the first regenerative braking is to be prohibited or limited, causes the second regenerative braking to be executed when the operation unit is set to a regeneration level in the regenerative braking power increasing direction from a predetermined regeneration level, and causes the second regenerative braking to be stopped when the operation unit is set to the predetermined regeneration level or a regeneration level in the regenerative braking power decreasing direction from the predetermined regeneration level thereafter.

3. The regenerative control device for the hybrid vehicle according to claim 1, wherein
the battery state detection unit is a charge state detection unit that detects a state of charge of the battery, and
wherein the one or more device stores instructions that further causes one or more processor to:
determine that it is necessary to restrict charging of the battery when the state of charge detected by the charge state detection unit is equal to or greater than a predetermined upper limit in a neighborhood of full charge.

4. The regenerative control device for the hybrid vehicle according to claim 2, wherein
the battery state detection unit is a charge state detection unit that detects a state of charge of the battery, and
wherein the one or more memory device stores instructions that further causes the one or more processor to:
determine that it is necessary to restrict charging of the battery when the state of charge detected by the charge state detection unit is equal to or greater than a predetermined upper limit in a neighborhood of full charge.

5. The regenerative control device for the hybrid vehicle according to claim 1, further comprising:
a vehicle speed detection unit that detects a traveling speed of the vehicle, wherein
wherein the one or more memory device stores instructions that further causes the one or more processor to:
cause the second regenerative braking to be executed when the traveling speed is equal to or greater than a predetermined speed.

6. The regenerative control device for the hybrid vehicle according to claim 2, further comprising:
a vehicle speed detection unit that detects a traveling speed of the vehicle,
wherein the one or more memory device stores instructions that further causes the one or more processor to:
cause the second regenerative braking to be executed when the traveling speed is equal to or greater than a predetermined speed.

* * * * *